(12) United States Patent
Hadrath (10) Patent No.: US 10,440,335 B2
(45) Date of Patent: Oct. 8, 2019

(54) TREATMENT OF LIGHT BY MEANS OF AN OPTICAL DEVICE

(71) Applicant: OSRAM GmbH, Munich (DE)

(72) Inventor: Stefan Hadrath, Falkensee (DE)

(73) Assignee: OSRAM GMBH, Munich (DE)

( * ) Notice: Subject to any disclaimer, the term of this patent is extended or adjusted under 35 U.S.C. 154(b) by 241 days.

(21) Appl. No.: 15/515,615

(22) PCT Filed: Sep. 28, 2015

(86) PCT No.: PCT/EP2015/072232
§ 371 (c)(1),
(2) Date: Mar. 30, 2017

(87) PCT Pub. No.: WO2016/050682
PCT Pub. Date: Apr. 7, 2016

(65) Prior Publication Data
US 2018/0007326 A1    Jan. 4, 2018

(30) Foreign Application Priority Data
Oct. 2, 2014 (DE) .......................... 10 2014 220 101

(51) Int. Cl.
*G03B 21/14* (2006.01)
*H04N 9/31* (2006.01)
(Continued)

(52) U.S. Cl.
CPC ......... *H04N 9/3152* (2013.01); *G02B 26/008* (2013.01); *G03B 21/16* (2013.01);
(Continued)

(58) Field of Classification Search
CPC ...... H04N 9/31; H04N 9/3152; H04N 9/3111; H04N 9/3114; H04N 9/3117;
(Continued)

(56) References Cited

U.S. PATENT DOCUMENTS 9,164,274 B2 *  10/2015  Lin ..................... G02B 26/008
9,581,887 B2 *   2/2017  Tajiri .................... G03B 21/28
(Continued)

FOREIGN PATENT DOCUMENTS

CN    202443241 U    9/2012
EP      0627643 A2   12/1994

OTHER PUBLICATIONS

International Search Report based on application No. PCT/EP2015/072232 (9 pages) dated Dec. 3, 2015 (for reference purpose only).

*Primary Examiner* — William C. Dowling
(74) *Attorney, Agent, or Firm* — Viering Jentschura & Partner MBB (57) ABSTRACT

An optical device is provided including a light-imaging component configured to focus light fed to the light-imaging component in at least one focusing spot, wherein the light fed includes at least one predefinable wavelength; and a conversion apparatus including at least one phosphor which is designed to convert light having the at least one predefinable wavelength into conversion light, wherein the conversion apparatus is arranged in such a way that the at least one phosphor is arranged in the focusing spot of the light-imaging component. The light-imaging component is configured to generate at least two focusing spots, and the conversion apparatus is arranged in such a way that the at least two focusing spots are positioned on the at least one phosphor.

13 Claims, 7 Drawing Sheets

(51) Int. Cl.
*G03B 21/20* (2006.01)
*G02B 26/00* (2006.01)
*G03B 21/16* (2006.01)
*G03B 33/08* (2006.01)

(52) U.S. Cl.
CPC ....... *G03B 21/204* (2013.01); *G03B 21/2033* (2013.01); *G03B 21/2066* (2013.01); *G03B 33/08* (2013.01); *H04N 9/3161* (2013.01)

(58) Field of Classification Search
CPC .... H04N 9/3161; G03B 21/14; G03B 21/204; G03B 21/2033; G03B 21/208
See application file for complete search history.

(56) References Cited

U.S. PATENT DOCUMENTS

| | | | |
|---|---|---|---|
| 9,618,737 B2 * | 4/2017 | Khan | G02B 26/008 |
| 2010/0245777 A1 | 9/2010 | Ogura | |
| 2012/0300178 A1 * | 11/2012 | Sugiyama | H04N 9/3111 |
| | | | 353/31 |
| 2013/0021582 A1 | 1/2013 | Fujita et al. | |
| 2013/0155648 A1 | 6/2013 | Morgenbrod et al. | |
| 2014/0118991 A1 | 5/2014 | Lin et al. | |
| 2014/0226306 A1 | 8/2014 | Khan et al. | |
| 2014/0268068 A1 * | 9/2014 | Takahashi | G03B 21/2066 |
| | | | 353/31 |
| 2015/0204519 A1 * | 7/2015 | Mueller | G03B 33/08 |
| | | | 362/84 |

* cited by examiner

TREATMENT OF LIGHT BY MEANS OF AN OPTICAL DEVICE

RELATED APPLICATIONS

The present application is a national stage entry according to 35 U.S.C. § 371 of PCT application No.: PCT/EP2015/072232 filed on Sep. 28, 2015, which claims priority from German application No.: 10 2014 220 101.2 filed on Oct. 2, 2014, and is incorporated herein by reference in its entirety.

TECHNICAL FIELD

The present disclosure relates to an optical device including a light-imaging component configured to focus light fed to the light-imaging component in at least one focusing spot, wherein the light fed includes at least one predefinable wavelength, and a conversion apparatus including at least one phosphor which is designed to convert light having the at least one predefinable wavelength into conversion light, wherein the conversion apparatus is arranged in such a way that the at least one phosphor is arranged in the focusing spot of the light-imaging component. Furthermore, the present disclosure relates to a light module including a light source and an optical device. Finally, the present disclosure also relates to a method for treatment of light by means of an optical device including the following steps: feeding light to a light-imaging component of the optical device, which focuses the light fed to the light-imaging component in at least one focusing spot, wherein the light fed includes at least one predefinable wavelength, and converting the fed light having the at least one predefinable wavelength into conversion light by means of at least one phosphor of a conversion apparatus, wherein the conversion apparatus is arranged in such a way that the at least one phosphor is arranged in the focusing spot of the light-imaging component.

BACKGROUND

An optical device, a light module and a method for the operation thereof are known in principle from US 2010/0245 777 A1. The latter discloses a light projector including a laser as light source, wherein white light is generated from laser light generated by the laser by means of a phosphor wheel by virtue of the latter rotating and being irradiated by the laser light in a sector. In the circumferential direction the phosphor wheel is coated with different phosphors that convert the laser light into respective conversion light of different other wavelengths. The phosphors of the phosphor wheel are thus arranged successively in the direction of rotation, that is to say in the circumferential direction of the phosphor wheel, such that the light emitted by the respective phosphor, namely the respective conversion light, is generated sequentially in time and is fed to an imaging system. In this case, the temporal succession on account of the rotation of the phosphor wheel and the selection of the phosphors is such that the impression of white light is generated for the human eye. The actual light source is the laser, however, in said document. The technology based thereon is also known under the designation Laser Activated Remote Phosphor (LARP).

In order to distribute the light power of the laser light emitted by the laser over the largest possible area of the phosphor and thus to reduce a thermal stress of the phosphor, inter alia, the phosphor is usually applied to the phosphor wheel, which rotates during operation. During operation as intended, the phosphor is heated on account of the light conversion. The heat is dissipated by radiation, convection and also heat conduction, for example via a shaft of the phosphor wheel, until a steady-state operating temperature is established. The efficiency of the conversion of many phosphors decreases as the temperature of the respective phosphor increases, particularly in the case of nitridic phosphors for the red spectral range. A more than proportional increase in the heat dissipation should thus be taken into account for high light powers. Although this can be compensated for by enlarging the phosphor wheel, this leads to increased costs and larger structural volume.

SUMMARY

The present disclosure is based on the object of developing an optical device, a light module and a method for the operation thereof to the effect that a more compact design can be achieved at high light power.

As solutions, the present disclosure proposes an optical device as claimed in independent claim 1 and a light module as claimed in further independent claim 12. Finally, the present disclosure proposes a method as claimed in further independent claim 13. Further advantageous embodiments are evident on the basis of features of the dependent claims.

In particular, in the case of an optical device the present disclosure provides for the light-imaging component to be configured to generate at least two focusing spots, and for the conversion apparatus to be arranged in such a way that the at least two focusing spots are positioned on the at least one phosphor.

In respect of the light module it is proposed, in particular, that the light module includes an optical device according to the present disclosure.

Finally, in respect of the method it is proposed, in particular, that at least two focusing spots are generated by means of the light-imaging component, wherein the conversion apparatus is arranged in such a way that the at least two focusing spots are positioned on the at least one phosphor.

The present disclosure makes use of the insight that the utilization of the phosphor can be significantly improved with a plurality of focusing spots. In this case, the present disclosure is not restricted to two focusing spots, rather it can provide a plurality of focusing spots, for example three, four or five. It proves to be advantageous here if the present disclosure only requires light fed from a single light source. The optical device generates, from the light fed by this advantageously single light source, a plurality of focusing spots which are arranged jointly on the phosphor, but at different positions. Particularly advantageously, the focusing spots can be arranged in a focusing plane in which the phosphor is arranged. The focusing plane can be embodied for example perpendicularly to an optical axis of the optical device. As a result, the phosphor can be thermally stressed more uniformly, wherein high local stresses can be reduced. Furthermore, it is also possible to achieve a more uniform temperature distribution in the phosphor, such that internal stresses of the phosphor that are based thereon can be reduced. The reliability can thus likewise be improved.

It may be provided, for example, that at least two phosphors are provided in such a way that substantially white light can be provided in the combination of the conversion light of said phosphors. Of course, it may also be provided that the phosphors are chosen in such a way that it is possible to provide colored light in a predefinable manner in a departure from white light.

Furthermore, it may be provided that by exchanging the phosphor in the region of the focusing spots, the type of conversion light can be easily altered or switched. For this purpose, it may be provided that a plurality of phosphors, advantageously having different conversion behavior, are arranged adjacently to one another, for example on a carrier or the like. In the case of a carrier, it may be provided that said carrier can be moved in a predefinable manner, such that the focusing spots can be positioned in a correspondingly predefinable manner onto the desired phosphors. It is also possible, as illustrated further below in the embodiment concerning FIG. 9, to move the optical system instead of the carrier.

The light-imaging component serves to treat the light fed, which may be for example light from a laser, in particular a laser diode or the like, in such a way that the at least two focusing spots are formed. The focusing spots may also be focal points that can be attained by the light-imaging component. However, it may also be provided that the focusing spots are chosen in an adapted manner in accordance with a phosphor region to be illuminated. For this purpose, the light-imaging component may include optical focusing elements such as lenses, mirrors, combinations thereof or the like. Advantageously, the focusing spots are arranged adjacently to one another. This has the advantage that the at least one phosphor can be arranged in one plane, such that the light fed can impinge on the phosphor, advantageously over a large area, in a simple manner. By way of example, it may be provided that even in the case of a plurality of phosphors, the focusing spots are at least predominantly, advantageously all, positioned only onto a single one of the phosphors. In addition, it may be provided, of course, that the focusing spots are positioned onto at least two of the phosphors. For the purpose of generating a plurality of focusing spots, the light-imaging component may include a corresponding arrangement of lenses and mirrors.

Depending on the light source that provides the light to be fed, the light fed has at least one predefinable wavelength. However, the application of the present disclosure is not restricted to light sources that only generate light having a single wavelength or having a small number of wavelengths. The present disclosure is, of course, in particular also suitable for light sources that generate a wide spectrum of light. In this respect, the light fed may also be from light emitting diodes, gas discharge lamps, combinations thereof or the like.

The term light within the meaning of the present disclosure is not restricted to visible light, but rather simultaneously also includes ultraviolet light and infrared light. This applies both to the light fed and to the conversion light. Particularly advantageously, the present disclosure is, of course, suitable in conjunction with laser light as light fed or else in conjunction with light provided by light emitting diodes as light fed.

In principle, the light source can be formed from a single light source, which is for example a semiconductor laser light source configured, for example, to generate laser light of substantially a single identical wavelength. Furthermore, it may be provided, of course, that the light source combines a plurality of semiconductor laser light sources and/or light-emitting diodes with one another, which generate the fed light of different wavelengths.

The conversion apparatus includes the at least one phosphor which is designed to convert the fed light having the at least one predefinable wavelength into conversion light. For this purpose, the conversion apparatus may include a plurality of phosphors that furthermore enable the light fed to be converted into different conversion light. The conversion apparatus is arranged for the present disclosure in such a way that the at least one phosphor is arranged in the at least two focusing spots of the light-imaging component. As a result, the at least two focusing spots are positioned on the at least one phosphor. If more than two focusing spots are provided, then these are, of course, advantageously all positioned on the phosphor. It may furthermore be provided that the phosphor is formed from regions of different phosphors which are advantageously arranged adjacently to one another, wherein focusing spots are positioned on at least two of the phosphors. As a result, conversion light can be generated by at least two different phosphors simultaneously. The phosphor can in principle be embodied as a disk or be applied on a disk-shaped carrier. Such an embodiment may also be referred to as a phosphor disk or phosphor wheel.

In principle, the conversion apparatus can consist only of the phosphor. It may furthermore also be provided, however, that the conversion apparatus provides a carrier for the at least one phosphor, on which the phosphor is arranged. The carrier can be provided in a moveable fashion, in particular in an exchangeable fashion, such that for maintenance purposes or else for adaptation to particular applications the phosphor can be changed or exchanged in virtually any desired manner. This proves to be particularly advantageous if the phosphor is arranged in a stationary fashion, that is to say advantageously in a rotationally fixed manner, relative to the light-imaging component. By way of example, the phosphor can be arranged on a carrier of the conversion apparatus. The carrier can be embodied as—depending on the application—transparent or nontransparent, in particular reflective. A transparent carrier can be formed for example from a suitable material such as sapphire or the like.

The at least one phosphor may include for example nitride- and/or phosphorus-based substances by means of which a conversion of the light fed into conversion light having a desired wavelength can be achieved.

In accordance with one development it is proposed that the conversion apparatus includes at least one first and one second phosphor different than the first, wherein one of the focusing spots is positioned on the first and another of the focusing spots is positioned on the second phosphor. As a result, conversion light of the different phosphors can be generated simultaneously. What can furthermore be achieved as a result of the parallel generation of conversion light by means of different phosphors is that the same combination of conversion light of the two phosphors can always be generated independently of a movement of the phosphor.

In accordance with a further embodiment of the present disclosure it is proposed that the light-imaging component includes two axicons the optical axes of which are aligned coaxially with respect to one another and with respect to a light incidence axis of the light fed, wherein the axicons are arranged in such a way that conically embodied surfaces of the axicons face one another. An axicon is a special, conically ground lens. By means of an axicon, irradiation can be carried out using collimated light which can advantageously originate from a point light source and is initially collimated for example by means of a lens. The axicon furthermore makes it possible to image fed light, in particular laser light, into a ring. The latter property is used by the present disclosure to generate the at least two focusing spots. By means of the two axicons in the abovementioned arrangement with respect to one another, the fed light, for example the laser light, in the form of a light beam can be transformed to a ring which serves for example directly for feeding the light to the phosphor.

What can be achieved as a result is that the at least two focusing spots can be generated by further simple optical components, by means of which focusing spots the at least one phosphor can be impinged on.

It is furthermore proposed that the light-imaging component is configured to generate the focusing spots at least partly on a ring which is coaxial with respect to the optical axis. This embodiment proves to be advantageous, particularly in conjunction with the axicons, because the latter can already provide a light ring which is advantageously coaxial with respect to the optical axis.

The dimensioning of the axicons is advantageously designed in accordance with the focusing spots to be generated. In the present embodiment it is provided that by means of the arrangement of the axicons with respect to one another and with respect to the light incidence axis of the light fed, the light fed is imaged onto a ring. Advantageously, lenses are arranged at this location, by means of which lenses the light ring generated from the fed light by the axicons is imaged to the focusing spots. In principle, one or more mirrors can also be provided instead of or in addition to the lenses.

In accordance with one development it is proposed that the conversion apparatus is embodied as a conversion disk and includes at least one first and one second phosphor different than the first, wherein the at least one first and one second phosphor are arranged on the conversion disk adjacently to one another radially in relation to the optical axis and the light-imaging component is configured to set a distance between the axicons along the optical axis in such a way that, depending on the set distance, the focusing spots are positioned in each case on the first and/or the second phosphor. What can be achieved by means of this embodiment is that by setting the distance between the axicons, it is possible to select the phosphor which currently generates conversion light for a desired application in a desired manner. In this way, it is possible to create an optical component in which conversion light can be set in any desired manner by means of a simple mechanical distance setting. In this case, this embodiment makes use of the effect that a diameter of the light ring generated by the axicons can be set by means of the distance between said axicons. If the phosphor is arranged in radially adjacent regions in relation to an axis of the light ring generated by the axicons, then the choice of the distance between the axicons makes it possible to set the light ring in such a way that it is provided in accordance with the position of the desired phosphor to be selected. As a result, by means of focusing elements, such as the lenses and/or mirrors described above, for example, it is possible to achieve a generation of focusing spots on the respectively desired phosphor. Without having to intervene in the conversion apparatus, there is thus the possibility of generating conversion light in a desired manner and of varying this in a desired manner. By way of example, it may be provided that white light is generated in a first position by means of the conversion light, whereas in a second setting of the distance a radially adjacent region of a second phosphor is generated, which generates infrared light as conversion light. Overall, it is thereby possible to further improve the flexibility with regard to the generation of conversion light even in relation to a switchover possibility.

A further embodiment provides for the conversion disk to include the at least one first and one second phosphor adjacent to one another in a circumferential direction of the conversion disk in relation to the optical axis. As a result, it is possible to generate and to use conversion light from two different phosphors simultaneously. For this purpose, the optical device may additionally include optical guiding means for combining the conversion light of the phosphors. This embodiment does not necessarily require a phosphor disk that rotates relative to the optical device. Nevertheless, such a device can be provided.

With the present disclosure, in principle it is no longer necessary to arrange the phosphor on a rotating phosphor disk. According to the present disclosure, the phosphor can thus also be arranged in a stationary fashion, in particular in a positionally fixed manner, in relation to the optical device.

The provision of the at least two focusing spots already makes it possible to achieve a sufficient conversion.

Furthermore, it is proposed that the light-imaging component includes a lens arrangement for generating the focusing spots. The lens arrangement is advantageously provided in such a way that it generates the at least two focusing spots. In particular, the lens arrangement proves to be advantageous in conjunction with the axicons, wherein the lens arrangement includes at least two lenses which are arranged in the region of the light ring generated by the axicons. Advantageously, the lens arrangement includes at least one lens for each focusing spot to be generated, said at least one lens being assigned to said focusing spot. As a result, at least two focusing spots can be generated in a simple manner, in particular also in an adjustable manner.

Furthermore, it proves to be advantageous if the conversion disk is arranged in a rotationally fixed manner. Required mounting and bearing devices for a rotatable arrangement of the conversion disk can be avoided in this way. Furthermore, a drive for the conversion disk, such as is required for example in accordance with the teaching of US 2010/0245 777 A1, can also be obviated. Overall, outlay and activity during intended operation of the optical device can be obviated as a result.

In accordance with a further embodiment of the present disclosure it is proposed that the conversion apparatus is embodied in a reflective fashion and the light-imaging component includes on the light feeding side an optical isolation used for isolating the light fed from the conversion light reflected by the conversion apparatus. What can be achieved as a result is that the light-imaging component can be used both on the light-feeding side and on the light-outputting side. As a result, an outlay on component parts can be reduced overall. The light fed can be isolated from the conversion light by means of the optical isolation unit. The isolation unit may include for example a dichroic mirror, a chromatic lens, combinations thereof or the like.

In accordance with one development it is proposed that the conversion apparatus includes a region for transmitting at least part of the light fed, and the light-imaging component includes a light-guiding assembly configured to combine light transmitted by the conversion apparatus with the light reflected by the conversion apparatus. This embodiment has the advantage that it is possible to generate a mixed light including not only the conversion light of the phosphor(s) but also a non-compassed part of the light fed. For this purpose, the conversion apparatus can have a window or an opening through which the part of the light fed can pass through the conversion apparatus, without impinging on the phosphor. This can be achieved for example by providing in the region of the position of one of the focusing spots a window without phosphor, said window being transparent, more particularly to the light fed, or an opening in the phosphor. By means of the suitable light-guiding assembly, the transmitted light fed is deflected in such a way that it can be combined with the conversion light of the phosphor or phosphors. At the same time the conversion apparatus is configured in the region of the phosphor in such a way that the conversion light is emitted in the direction of the light fed. The term direction in this sense should not be understood restrictively in exactly the same direction, but rather as a solid angle opening in this direction.

It may be provided, for example, that blue light serves as light fed, and two phosphors are provided, which respectively emit a red and green light as conversion light when blue light impinges on them. If at least three focusing spots are then generated, two being positioned on the respective phosphors and one on the transmission window, the conversion light of the phosphors can be combined with the transmitted light in order to obtain white light.

Advantageously, the optical device furthermore includes a light-outputting component for combining light emitted by the conversion apparatus on account of the at least two focusing spots, wherein the light-outputting component includes an arrangement of two axicons that is mirrored in relation to the conversion apparatus in accordance with the light-imaging component. This embodiment proves to be advantageous in particular in the case of a conversion apparatus which is provided for a transmission of light, that is to say that the light fed impinges on the conversion apparatus on one side and the conversion light is emitted on the opposite side. By virtue of the corresponding arrangement of the light-outputting components, the conversion light provided by the conversion apparatus can advantageously be combined to form a common light beam, such that mixed light is provided, which is advantageously white light. As a result, not only is it possible to increase the power overall, for example if the conversion apparatus includes only a single phosphor, but it is also possible moreover to generate virtually arbitrary light colors.

In accordance with one development it is proposed that the light-outputting component is configured to set a distance between the axicons along the optical axis depending on the distance between the axicons of the light-imaging component, in order to combine light emitted by the phosphor of the conversion apparatus on account of the positioning of the focusing spots.

This embodiment allows advantageously a single light beam of light fed to be converted into precisely such a light beam with conversion light, if appropriate mixed light, by means of the conversion apparatus. Furthermore, there is the possibility as required—as already discussed above—of setting the conversion light by selecting the phosphors on which the focusing spots are positioned. The optical device thus allows light of the desired color and/or intensity to be provided, in particular for lighting purposes.

Furthermore, it is proposed that the light-outputting component includes on the conversion apparatus side a converging lens arrangement configured in accordance with a number of the focusing positions. What can be achieved as a result is that the conversion light is combined in accordance with the focusing positions. It may be provided that the converging lens arrangement, in accordance with the desired provision of light, does not capture all focusing positions, but rather only a predefinable selection. In this respect, the converging lens arrangement may be adjustable by virtue of only a predefined number of focusing positions being captured.

BRIEF DESCRIPTION OF THE DRAWINGS

Further advantages and features can be gathered from the following description of exemplary embodiments with reference to figures. In the figures, identical components parts and functions are designated by identical reference signs.

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
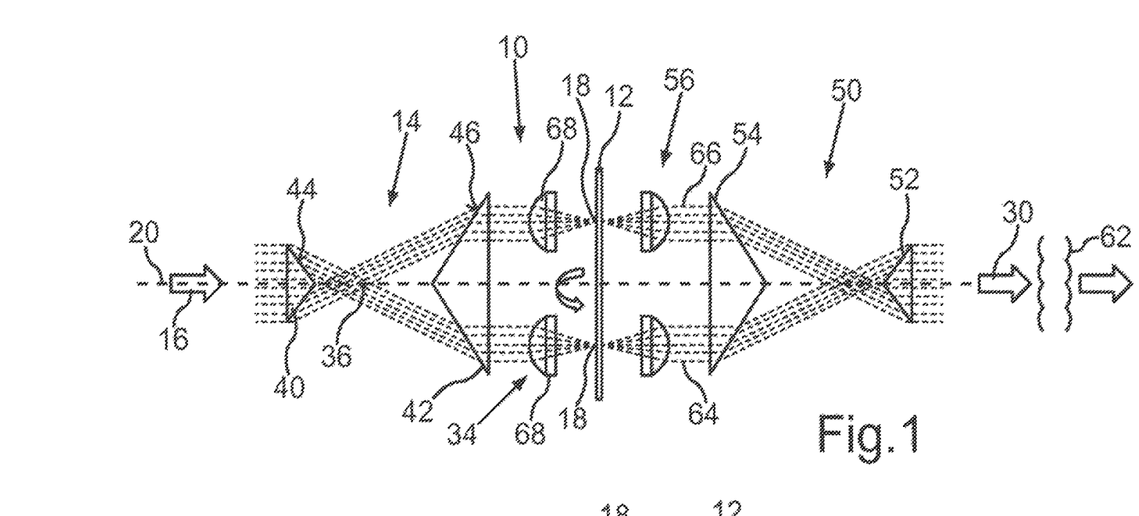
FIG. 1 shows, in a schematic basic view, a first embodiment of an optical device according to the present disclosure.

FIG. 1 shows, in a schematic basic view, an optical device 10 according to the present disclosure including a light-imaging component 14 configured to focus light 16 fed to the light-imaging component 14 in eight focusing spots 18, two of which are illustrated in FIG. 1. In the present case, the light 16 fed is laser light having a wavelength of approximately 450 nm.

The optical device 10 furthermore includes a conversion apparatus 12, which in the present case includes three phosphors 22, 24, 26 and a transmission window 28. In the present case, the conversion apparatus 12 is embodied as a phosphor disk mounted in a rotatable fashion. Each of the phosphors 22, 24, 26 is designed to convert the light 16 fed into respective conversion light 64, 66. The conversion light of the six further focusing points is not illustrated in the present embodiment.

The phosphor disk 12 is configured for a conversion apparatus configured on the basis of transmission and is arranged in such a way that the phosphors 22, 24, 26 and the transmission window 28 are arranged in the focusing spots 18 of the light-imaging component 14.

For this purpose, the light-imaging component 14 is configured to generate the focusing spots 18, eight thereof in the present case, two of which are illustrated in FIG. 1. The phosphor disk 12 is arranged in such a way that the eight focusing spots 18 are positioned on the phosphors 22, 24, 26 and the transmission window 28.

In the present case, the light 16 fed is light from a laser diode, which is not illustrated in further detail in the figures. The laser diode, in the same way as the optical device 10, is part of a light module (not illustrated in further detail). The light 16 fed is fed to the light-imaging component 14 with a light incidence axis 20.

Figure 2:
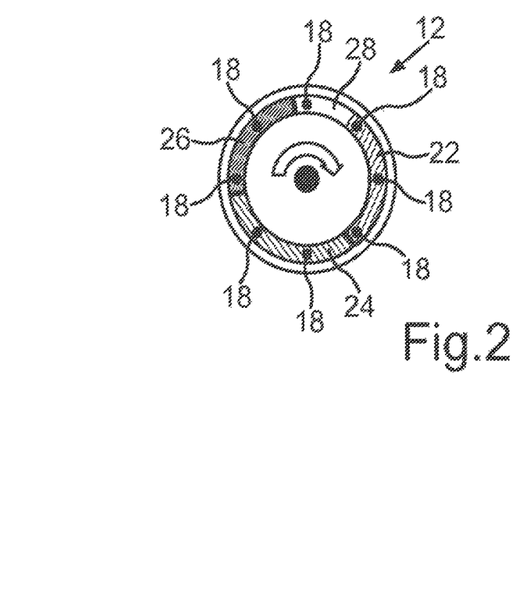
FIG. 2 shows, in a plan view, a schematic illustration of a phosphor disk for the optical device in accordance with FIG. 1.

FIG. 2 schematically shows the conversion apparatus 12 embodied as a phosphor disk, in a plan view. It can be discerned that the phosphors 22, 24, 26 and the transmission window 28 are arranged adjacently to one another in a ring-shaped fashion. The phosphor disk 12 is in rotation during the intended operation, such that the focusing spots 18 are positioned on the phosphors 22, 24, 26 circulating relative to said focusing spots, and on the transmission window 28. Given substantially constant rotation of the phosphor disk 12, the positions of the phosphors 22, 24, 26 and of the transmission window 28 relative to the focusing spots 18 change regularly.

As is furthermore evident from FIG. 1, the light-imaging component 14 includes two axicons 40, 42, the optical axes 36 of which are aligned coaxially with respect to one another and with respect to the light incidence axis 20 of the light 16 fed. The axicons 40, 42 are furthermore arranged in such a way that conically embodied surfaces 44, 46 of the axicons 40, 42 face one another. What is achieved by means of this arrangement of the axicons is that the light 16 fed along the light incidence axis 20 is imaged in a ring-shaped fashion. Advantageously, the light ring generated by the light-imaging component 14 corresponds to the annular arrangement of the phosphors 22, 24, 26 and of the transmission window 28 of the phosphor disk 12.

It is furthermore evident from FIG. 1 that the light-imaging component 14 includes a lens arrangement 34 for generating the focusing spots 18 from the light ring generated by the axicons 40, 42. In the present case, for this purpose eight convex lenses 68 are provided, two of which are illustrated in FIG. 1. Each of the convex lenses 68 generates one of the focusing spots 18.

In the present case, the phosphor disk forming the conversion apparatus 12 is arranged in a focusing plane (not designated any further) which is arranged perpendicularly to the optical axis 36 and in which the focusing spots 18 are positioned. In the present case, the focusing spots 18 are generated on a ring which is coaxial with respect to the optical axis 36 (also cf. FIG. 2).

Figure 3:
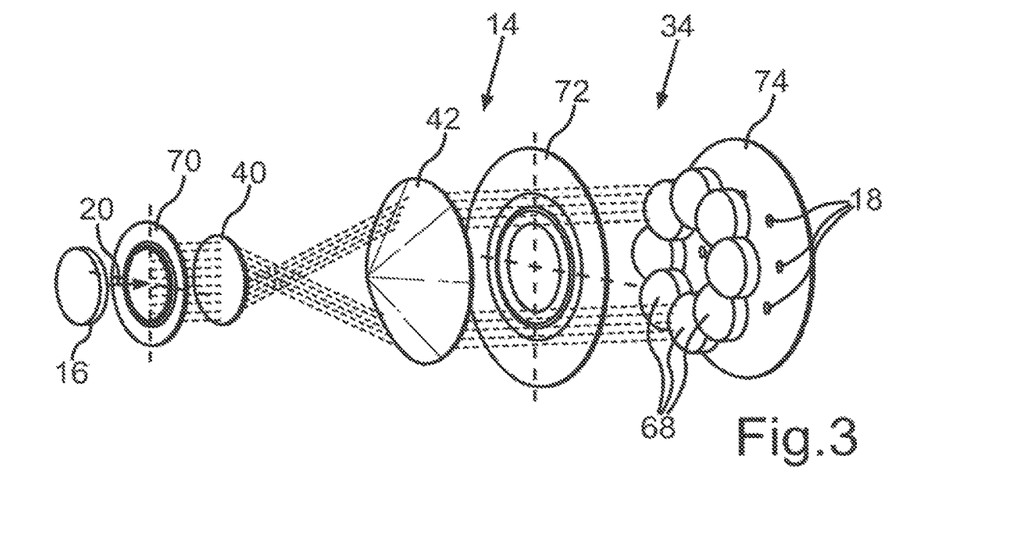
FIG. 3 shows a perspective illustration of a light-imaging component of the optical device in accordance with FIG. 1.

FIG. 3 shows a perspective illustration of the light-imaging component 14 and the beam path brought about thereby. A diameter of the laser light 16 fed is illustrated schematically in the left-hand region of FIG. 3. Said laser light is fed to the first axicon 40 along a light incidence axis 20. A representation 70 represents the intensity of the light 16 fed in cross section. It can be discerned that a substantially homogeneous light intensity is present within a diameter of the light 16 fed and falls sharply in the direction of zero in the region of the outer diameter. The first axicon 40 diverts the fed light 16 onto the second axicon 42. The two axicons 40, 42 are arranged in a manner spaced apart coaxially with respect to one another and their conically embodied surfaces 44, 46 face one another.

This arrangement of the axicons 40, 42 generates a light ring, such as is represented in the intensity representation 72 between the second axicon 42 and a lens arrangement 34 including lenses 68 that optically succeeds said second axicon.

In the present case, the lens arrangement 34 includes the eight lenses 68 arranged in the region of the light ring. By means of the lenses 68, the ring-shaped light generated by the axicons 40, 42 is focused onto the eight focusing spots 18, as is evident on the basis of the intensity representation 74.

In the case of the embodiment in accordance with FIG. 1 it is provided that the phosphor disk 12 is configured for transmission. In the case of this embodiment, the conversion light 64, 66 is emitted on the opposite side relative to the focusing spots 18. By means of a light-outputting component 50, the conversion light 64, 66 and light transmitted through the transmission window 28 are captured and combined to form mixed light 30. In the present case, the mixed light 30 is white light.

The light-outputting component 50 includes a converging lens arrangement 56 assigned to each of the focusing spots 18. The converging lens arrangement 56 images the conversion light 64, 66 and the transmitted light of the phosphor disk 12 onto an arrangement of two axicons 52, 54. The arrangement of the axicons 52, 54 is embodied here with regard to the radiation path, in a mirrored manner with respect to the arrangement of the axicons 40, 42 of the light-imaging component 14. As a result, the conversion light 64, 66 and the transmitted light of the phosphor disk 12 are combined to form a common light beam, whereby a mixed light 30 is formed. A color combination of the mixed light 30 is chosen in such a way that white light is formed as mixed light 30. In order to improve the mixing effect, the mixed light 30 is fed to a microlens array 62.

Figure 4:
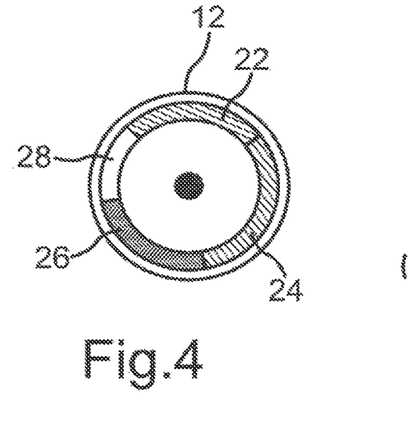
FIG. 4 shows a schematic side view of the phosphor disk in accordance with FIG. 2.

FIG. 4 shows the phosphor disk 12 from FIG. 2 without the focusing spots 18. It can be discerned that the phosphors 22, 24, 26 are arranged in an annulus on the phosphor disk 12. Furthermore, the transmission window 28 is likewise arranged in the same ring. The phosphors 22, 24, 26 and the transmission window 28 are arranged circumferentially directly adjacently to one another, that is to say in a manner adjoining one another.

Figure 5:
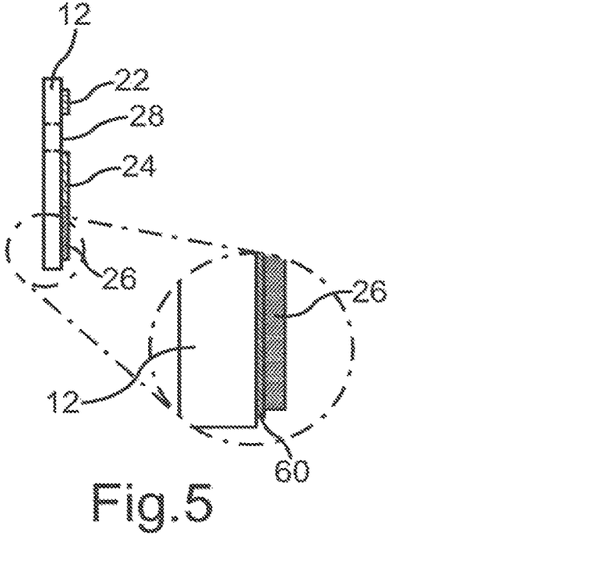
FIG. 5 shows a schematic sectional view of the phosphor disk in accordance with FIG. 4.

FIG. 5 shows a schematic vertical sectional view in accordance with FIG. 4 in an upper illustration on the left, wherein it is evident that the phosphor disk 12 includes a circular carrier (not designated), which is formed from sapphire in the present case. The phosphors 22, 24, 26 are applied on a surface of the carrier. The sapphire is free of phosphor in the region of the transmission window 28.

An enlarged excerpt is illustrated in a lower illustration on the right in FIG. 5. It can be discerned that a dichroic coating 60 is provided between the sapphire and the phosphor, here the phosphor 26. Said coating 60 is not provided in the region of the transmission window 28. A dichroic coating 60 that allows the short-wave light 16 fed to be transmitted, but reflects the converted light 64, 66 is arranged between the carrier composed of sapphire and the phosphors 22, 24, 26. The conversion efficiency can be improved as result. In the direction of propagation, therefore, the sapphire as carrier is arranged upstream of the dichroic coating 60 and the respective phosphor 22, 24, 26.

Figure 6:
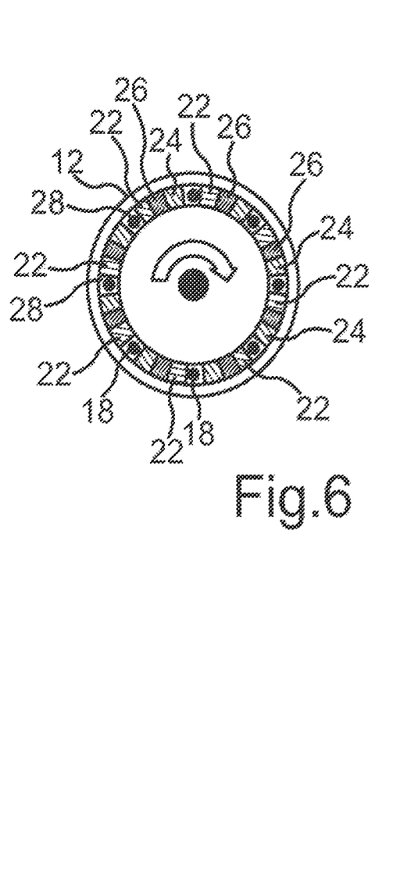
FIG. 6 shows a schematic illustration of a further phosphor disk for use in the optical device in accordance with FIG. 1, wherein the phosphors are arranged adjacent to one another in a ring in such a way that only conversion light of one phosphor is generated in each case by means of the focusing spots, and the phosphor disk is configured for rotary operation.
Figure 7:
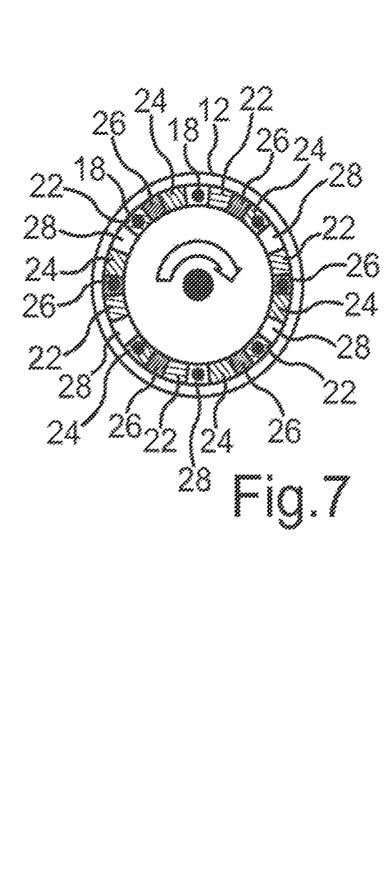
FIG. 7 shows, in a schematic illustration, a further embodiment of a phosphor disk as in FIG. 6 for rotary operation, wherein the phosphors are arranged adjacently to one another in a ring in such a way that white light is always generated as mixed light by means of the focusing spots.
Figure 8:
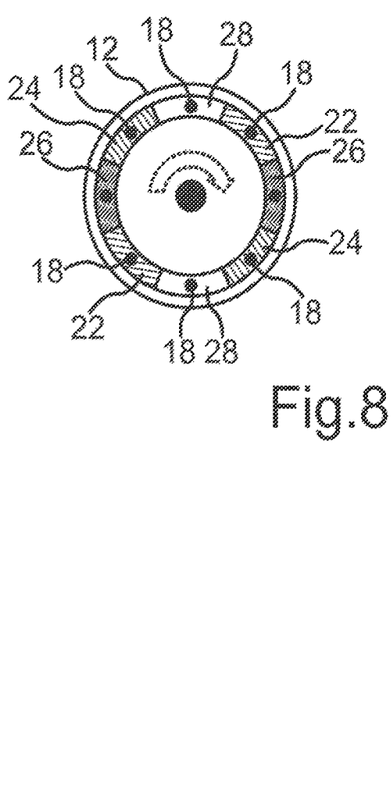
FIG. 8 shows, in a schematic illustration, a further embodiment of a phosphor disk as in FIGS. 6 and 7, wherein the phosphor disk is configured for non-rotary operation and white light is generated as mixed light by means of the phosphors arranged adjacently to one another in a ring-shaped fashion.

FIGS. 6 to 8 show further embodiments of conversion apparatuses 12 in the form of phosphor wheels. The phosphor wheels in FIGS. 6 to 8 are likewise constructed, in principle, in the manner as explained with reference to FIG. 5. Therefore, reference is supplementarily made to these explanations.

FIG. 6 illustrates, in a comparable illustration to FIG. 2, a phosphor disk 12 including different phosphors 22, 24, 26 arranged adjacently to one another in a ring-shaped fashion. Furthermore, transmission windows 28 are provided. The arrangement of the phosphors 22, 24, 26 and of the transmission windows 28 is such that, upon rotation of the phosphor disk 12, the eight focusing spots 18 always impinge on the same phosphor or the transmission windows 28. Thus, in a respective angular position, in each case only conversion light of a single phosphor is generated or transmission of the light 16 fed takes place. This phosphor disk 12 is provided for sequential operation. Rotation of the phosphor disk 12 ensures that the desired color combination, that is to say the sum of the colors changing over time, substantially always remains the same.

FIG. 7 shows an alternative embodiment to FIG. 6, wherein, in contrast to the configuration in accordance with FIG. 6, in the case of a specific angular position, a focusing spot 18 in each case impinges on at least one of the phosphors 22, 24, 26 used and on at least one transmission window 28. This phosphor disk 12 is provided for non-sequential operation. This phosphor disk 12, too, is provided for rotary operation. Each focusing spot therefore leads to different conversion light relative to adjacent focusing spots 18. However, it is provided here, too, that the sum of the generated light is always white light.

FIG. 8 shows a further embodiment of a phosphor disk 12, which is provided for non-rotary operation and for non-sequential operation. In this embodiment, the focusing spots 18 are always positioned on the same phosphor 22, 24, 26 or the transmission window 28. Advantageously, it is likewise provided here that the sum of the converted light is white light. Even if this embodiment is suitable for a non-rotating phosphor disk, nevertheless rotation can optionally be provided. The effect of the light conversion is not impaired thereby.

Figure 9:
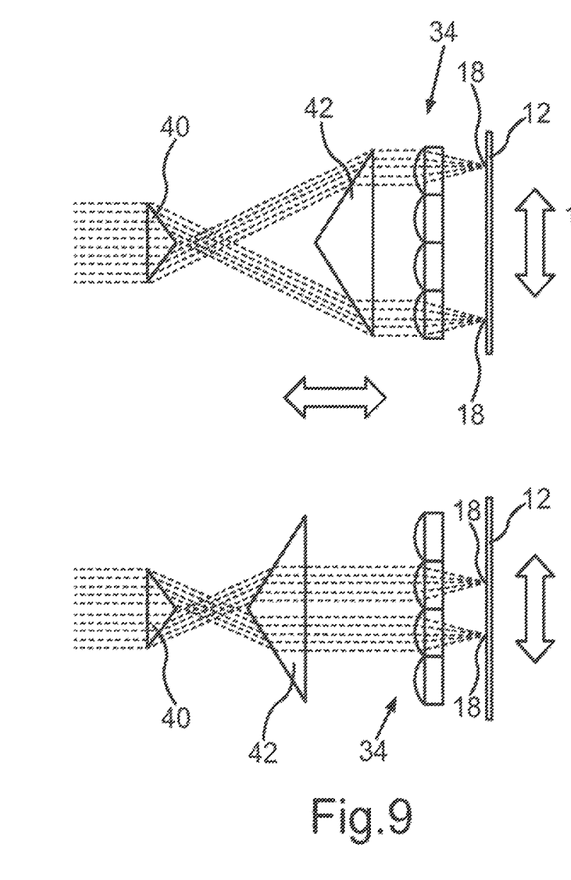
FIG. 9 shows, in a schematic illustration, a light-imaging component including two coaxial axicons, which are adjustable with regard to their distance with respect to one another.
Figure 10:
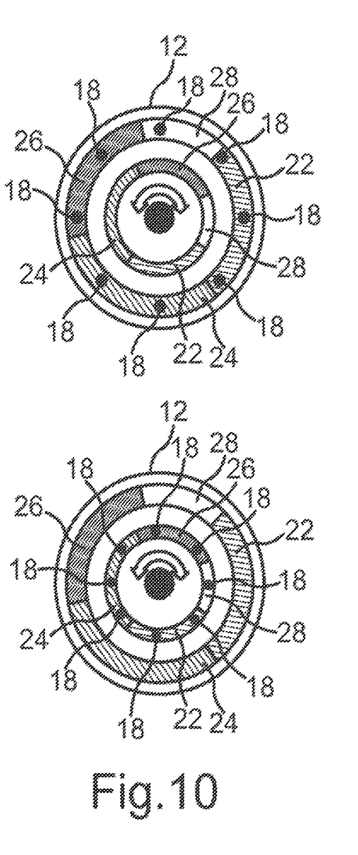
FIG. 10 shows, in a schematic illustration, a phosphor disk including two phosphor regions which are spaced apart from one another in a ring-shaped fashion and radially and in which different phosphors are arranged adjacently to one another in the circumferential direction, wherein focusing spots impinge on the outer ring in an upper illustration and on the inner ring in a lower illustration.

FIGS. 9 and 10 schematically show a further exemplary embodiment according to the present disclosure. FIG. 10 shows a phosphor disk 12 including, circumferentially radially adjacently to one another, ring regions with phosphor 22, 24, 26 and transmission windows 28. The phosphors 22, 24, 26 and the transmission window 28 are arranged adjacently to one another in an inner ring region. Radially outward with respect thereto, a further phosphor region is provided, in which likewise the phosphors 22, 24, 26 and a transmission window 28 are provided. In the present embodiment, however, the angular ranges of the phosphors 22, 24, 26 and of the transmission window 28 differ, such that light having a different color is generated in total upon the positioning of the focusing spots 18 on the respective ring region.

In the upper illustration in accordance with FIG. 10, the focusing spots 18 are positioned on the outer ring region. In the lower illustration in FIG. 10, by contrast, the focusing spots 18 are positioned on the inner ring region.

In order to achieve these different positionings of the focusing spots 18, in this embodiment of the present disclosure it is provided that the axicons 40, 42 are adjustable with regard to their distance with respect to one another (FIG. 9).

In the upper illustration in FIG. 9, the axicons 40, 42 are spaced far apart from one another, such that a light ring is generated which, with regard to the diameter, is adapted to the outer ring region of the phosphor disk 12 from FIG. 10. With a correspondingly embodied lens arrangement 34, eight focusing points are generated, which are positioned on the outer ring region of the phosphor disk 12 in accordance with FIG. 10.

In the lower illustration in accordance with FIG. 9, by contrast, the axicons 40, 42 are spaced apart to a lesser extent compared with the upper illustration. This has the effect that the light ring generated has a smaller diameter. In the present case, it is provided that the light ring diameter generated in this case corresponds to the inner ring region of the phosphor disk 12 illustrated in FIG. 10. For this setting state, too, the lens arrangement 34 includes an adapted lens arrangement 34 which likewise generates eight focusing spots, which are positioned on the inner ring region of the phosphor disk 12.

In this way, it is possible to switch between different phosphors and color combinations. The present embodiment provides for this phosphor disk 12 also to be operated in a rotary manner during intended operation.

Figure 11:
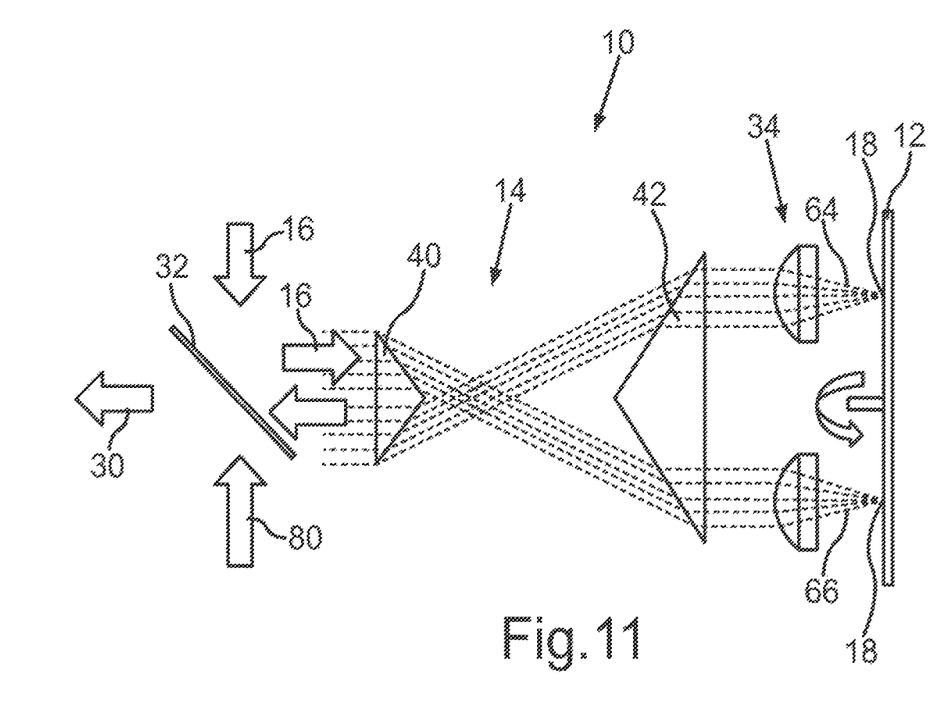
FIG. 11 shows, in a schematic illustration, an optical device in accordance with a further embodiment of the present disclosure, wherein a phosphor disk is used which is embodied in a reflective fashion.

FIG. 11 schematically shows a further embodiment of the present disclosure, wherein there is no need for a separate light-outputting component like the light-outputting component 50 in accordance with FIG. 1. The phosphor disk 12 provided in this embodiment is embodied in a reflective fashion. That is to say that the light-imaging component 14 serves both for feeding the light 16 fed and for outputting the conversion light 64, 66. In this regard, the corresponding light-imaging component 14 again has a construction as in FIG. 1. Therefore, in this regard reference is supplementarily made to the explanations concerning FIG. 1.

In order to isolate the fed light 16 from the conversion light 64, 66, a dichroic mirror 32 is provided on the input side, said dichroic mirror being reflective for the light 16 fed, but transmissive for the conversion light 64, 66. Blue light 80 is additionally fed to the dichroic mirror 32, said blue light likewise being reflected at the dichroic mirror 32 and being combined with the conversion light 64, 66 in order to form the light 30 provided for the illumination. In an alternative embodiment, a design including a dichroic mirror in which blue light is transmitted and conversion light is reflected is possible.

Figure 12:
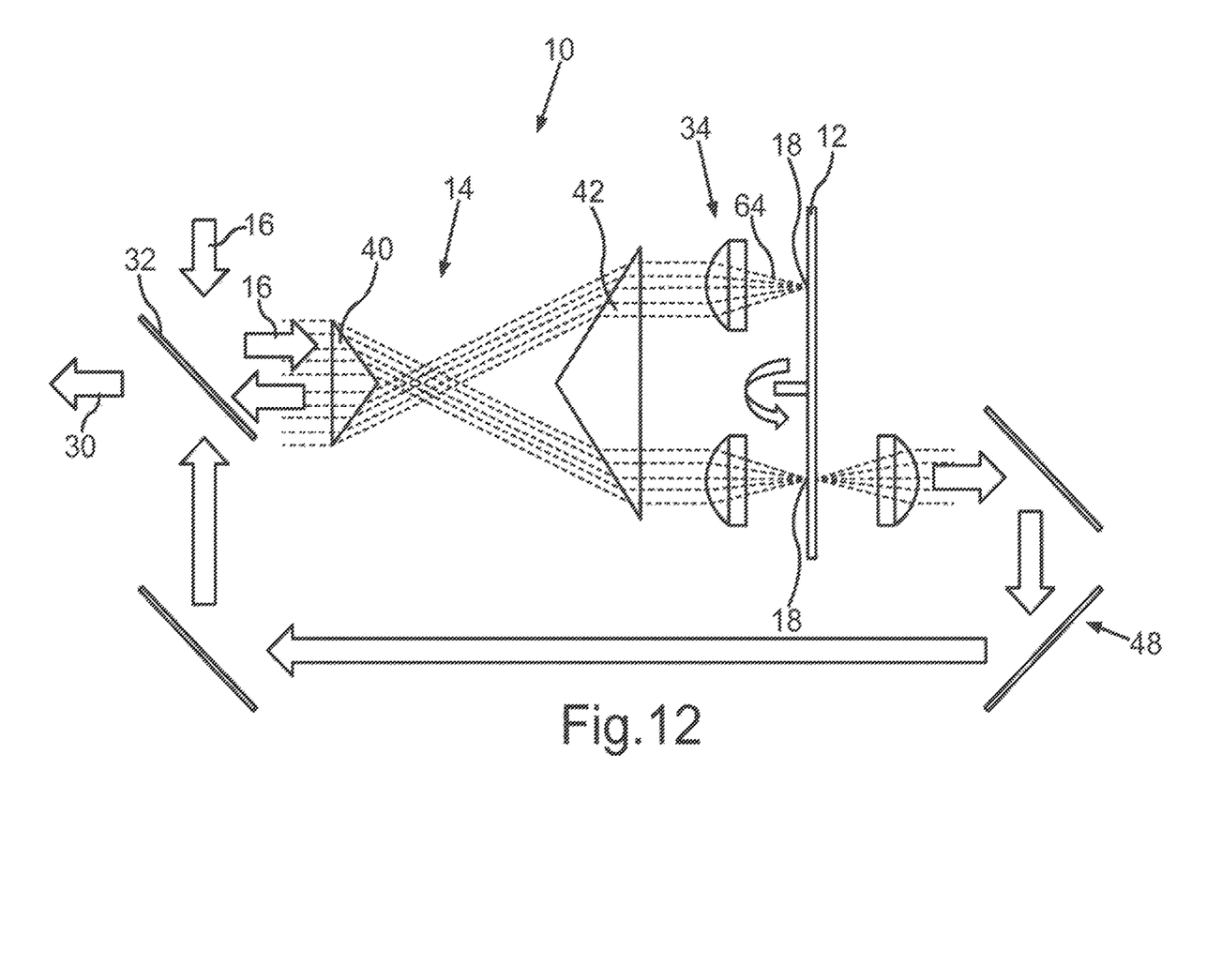
FIG. 12 shows in a schematic illustration, a further optical device in accordance with a further embodiment of the present disclosure, in which the phosphor disk has a window through which light fed is transmitted, and by means of a light-guiding assembly for combining conversion light of the phosphor disk with light fed.

FIG. 12 schematically shows a further embodiment of the present disclosure, which is based on the exemplary embodiment in accordance with FIG. 11. In order to avoid the separate feeding of blue light 80 in accordance with FIG. 11, in this embodiment it is provided that the phosphor disk 12 has a transmission window (not illustrated in FIG. 12) through which part of the light 16 fed is transmitted by the phosphor disk 12 and is guided by means of a light-guiding unit 48 to the dichroic mirror 32, where, as described above with regard to FIG. 11, it is fed to the conversion light 64, 66 in order to form the light 30 for lighting purposes. In this embodiment, too, as in FIG. 11, it is provided that the conversion light 64, 66 uses the light-imaging component 14 counter to the light 16 fed.

Figure 13:
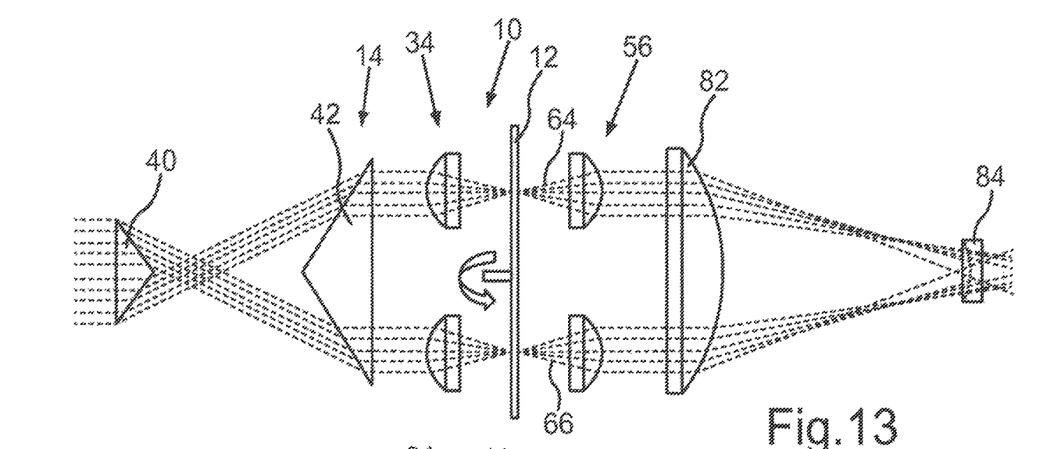
FIG. 13 shows in schematic illustration, a further optical device in accordance with a further embodiment of the present disclosure, wherein a converging lens arrangement for combining the conversion light is provided in a departure according to FIG. 1.
Figure 14:
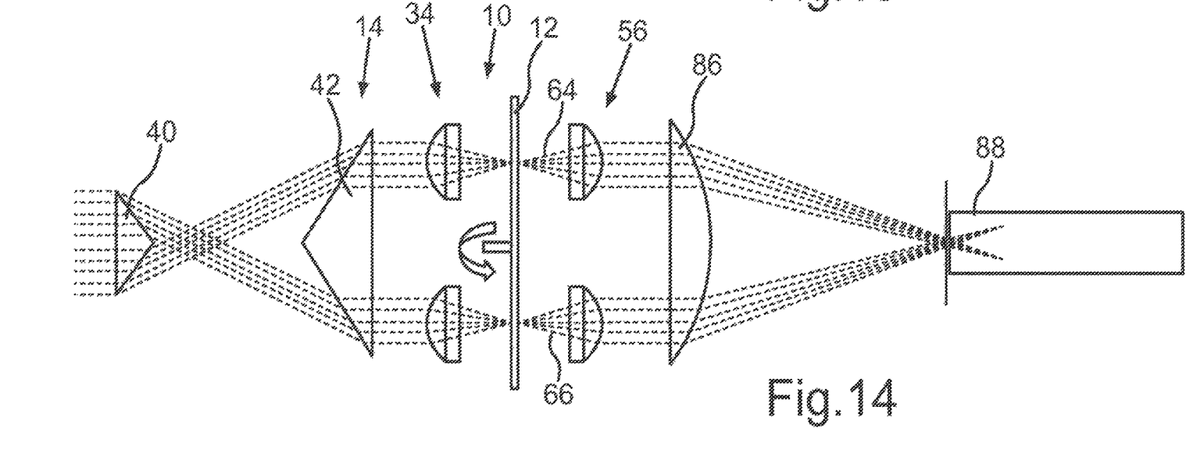
FIG. 14 shows, in a schematic illustration, a further optical device in accordance with a further embodiment of the present disclosure on the basis of the embodiment in accordance with FIG. 13, wherein a light-outputting component is provided, by means of which the conversion light is fed to an optical integrator.

Further embodiments of the present disclosure are illustrated schematically in accordance with FIGS. 13 and 14, said further embodiments being based on the exemplary embodiment in accordance with FIG. 1. Therefore, reference is supplementarily made to the explanations concerning said example. In contrast to the embodiment in accordance with FIG. 1, the embodiment in accordance with FIG. 13 includes, in the light-outputting assembly 50, a converging lens 82 instead of the axicons 52, 54, by means of which converging lens the converted light 64, 66 is fed to a concave lens 84.

A further embodiment is shown in FIG. 14, which differs from the embodiment in accordance with FIG. 13 in that, instead of the converging lens 82, a converging lens 86 is provided which focuses the conversion light 64, 66 onto an entrance surface of an optical integrator 88. In the present case, the optical integrator 88 is formed by a cylindrical, in particular rectangular or hexagonal, glass rod or else mirror tunnel.

In principle, the number of focusing spots 18 can be chosen as desired and adapted as required. Furthermore, it is possible, of course, for a different number of focusing spots in each case to impinge on the different phosphors, in order thereby to influence the composition of the conversion light. For this purpose, it may furthermore be provided that the phosphors are arranged on surface regions of different sizes.

The present disclosure allows the optical device to be able to be adapted simply and rapidly as required. As a result, it is possible not only to change spent phosphor wheels, but also to adapt color spaces as required. The present disclosure furthermore allows the power of a single focusing spot on the phosphor to be reduced since this can be compensated for on account of the number of focusing spots. As a result, a lower heat loss is generated locally in the phosphor, such that the phosphor as such can be operated at a higher efficiency.

The embodiments explained above serve merely for explaining the present disclosure and are not restrictive for the present disclosure. The present disclosure can be used for any lighting purposes, for example room lighting, area lighting but also in projectors, spotlights/headlights or the like.

Finally, features of the claims and description can, of course, be combined with one another in virtually any desired manner in order to arrive at further embodiments within the scope of the present disclosure. It should further be noted that the advantages and features and also embodiments described for the device according to the present disclosure equally apply to the light module according to the present disclosure and respectively the corresponding method, and vice versa. Consequently, corresponding method features can be provided for device features, and vice versa.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

What is claimed is:

1. An optical device comprising:
   a light-imaging component configured to focus light fed to the light-imaging component in at least one focusing spot, wherein the light fed comprises at least one predefinable wavelength; wherein the light-imaging component comprises two axicons, optical axes of which are aligned coaxially with respect to one another and with respect to a light incidence axis of the light fed, wherein the axicons are arranged in such a way that conically embodied surfaces of the axicons face one another;
   a conversion apparatus comprising at least one phosphor which is designed to convert light having the at least one predefinable wavelength into conversion light, wherein the conversion apparatus is arranged in such a way that the at least one phosphor is arranged in the focusing spot of the light-imaging component; wherein the light-imaging component is configured to generate at least two focusing spots, and wherein the conversion apparatus is arranged in such a way that the at least two focusing spots are positioned on the at least one phosphor; and
   a light-outputting component for combining light emitted by the conversion apparatus on account of the at least two focusing spots, wherein the light-outputting component comprises an arrangement of the two axicons that is mirrored in relation to the conversion apparatus in accordance with the light-imaging component.

2. The optical device as claimed in claim 1, wherein the conversion apparatus comprises at least one first and one second phosphor different than the first, wherein one of the focusing spots is positioned on the first and another of the focusing spots is positioned on the second phosphor.

3. The optical device as claimed in claim 1 wherein the conversion apparatus is embodied as a conversion disk and comprises at least one first and one second phosphor different than the first, wherein the at least one first and one second phosphor are arranged on the conversion disk adjacently to one another radially in relation to the optical axis and the light-imaging component is configured to set a distance between the axicons along the optical axis in such a way that, depending on the set distance, the focusing spots are positioned in each case on the first and/or the second phosphor.

4. The optical device as claimed in claim 3 wherein the conversion disk comprises the at least one first and one second phosphor adjacent to one another in a circumferential direction of the conversion disk in relation to the optical axis.

5. The optical device as claimed in claim 1, wherein the light-imaging component comprises a lens arrangement for generating the focusing spots.

6. The optical device as claimed in claim 3, wherein the light-imaging component is configured to generate the focusing spots at least partly on a ring which is coaxial with respect to the optical axis.

7. The optical device as claimed in claim 3, wherein the conversion disk is arranged in a rotationally fixed manner.

8. The optical device as claimed in claim 1, wherein the conversion apparatus is embodied in a reflective fashion and the light-imaging component comprises on the light feeding side an optical isolation unit for isolating the light fed from the light reflected by the conversion apparatus.

9. The optical device as claimed in claim 8, wherein the conversion apparatus comprises a region for transmitting part of the light fed, and the light-imaging component comprises a light-guiding assembly configured to combine light transmitted by the conversion apparatus with the light reflected by the conversion apparatus.

10. The optical device as claimed in claim 1, wherein the light-outputting component is configured to set a distance between the axicons along the optical axis depending on the distance between the axicons of the light-imaging component, in order to combine light emitted by the phosphor of the conversion apparatus on account of the positioning of the focusing spots.

11. The optical device as claimed in claim 1, wherein the light-output component comprises on the conversion apparatus side a converging lens arrangement configured in accordance with a number of the focusing positions.

12. A light module comprising a light source and an optical device, the optical device comprising,
  a light-imaging component configured to focus light fed to the light-imaging component in at least one focusing spot, wherein the light fed comprises at least one predefinable wavelength; wherein the light-imaging component comprises two axicons, optical axes of which are aligned coaxially with respect to one another and with respect to a light incidence axis of the light fed, wherein the axicons are arranged in such a way that conically embodied surfaces of the axicons face one another;
  a conversion apparatus comprising at least one phosphor which is designed to convert light having the at least one predefinable wavelength into conversion light, wherein the conversion apparatus is arranged in such a way that the at least one phosphor is arranged in the focusing spot of the light-imaging component;
  wherein the light-imaging component is configured to generate at least two focusing spots, and the conversion apparatus is arranged in such a way that the at least two focusing spots are positioned on the at least one phosphor, wherein the light module is configured for feeding light generated by means of the light source to the optical device; and
  a light-outputting component for combining light emitted by the conversion apparatus on account of the at least two focusing spots, wherein the light-outputting component comprises an arrangement of the two axicons that is mirrored in relation to the conversion apparatus in accordance with the light-imaging component.

13. A method for treatment of light by means of an optical device comprising,
  feeding light to a light-imaging component of the optical device, which focuses the light fed to the light-imaging component in at least one focusing spot, wherein the light fed comprises at least one predefinable wavelength,
  converting the fed light having the at least one predefinable wavelength into conversion light by means of at least one phosphor of a conversion apparatus, wherein the conversion apparatus is arranged in such a way that the at least one phosphor is arranged in the focusing spot of the light-imaging component, wherein at least two focusing spots are generated by means of the light-imaging component, wherein the conversion apparatus is arranged in such a way that the at least two focusing spots are positioned on the at least one phosphor; and
  combining light emitted by the conversion apparatus using a light-outputting component on account of the at least two focusing spots, wherein the light-outputting component comprises an arrangement of two axicons that is mirrored in relation to the conversion apparatus in accordance with the light-imaging component.

* * * * *